No. 896,202. PATENTED AUG. 18, 1908.
G. H. EASLEY & F. O. BUCKLES.
FILTER.
APPLICATION FILED OCT. 29, 1907.

Witnesses
Joe. P. Wahler.
Wm. Bagger.

Inventors
Gilbert H. Easley &
Fletcher O. Buckles.
By Victor J. Evans.
Attorney

UNITED STATES PATENT OFFICE.

GILBERT H. EASLEY AND FLETCHER O. BUCKLES, OF BRISTOL, TENNESSEE.

FILTER.

No. 896,202.  Specification of Letters Patent.  Patented Aug. 18, 1908.

Application filed October 29, 1907. Serial No. 399,700.

*To all whom it may concern:*

Be it known that we, GILBERT H. EASLEY and FLETCHER O. BUCKLES, citizens of the United States, residing at Bristol, in the county of Sullivan and State of Tennessee, have invented new and useful Improvements in Filters, of which the following is a specification.

This invention relates to filters of that class which are used for the purpose of filtering rain water in order to purify the latter before its admittance into a cistern or reservoir; and the principal object of the present invention is to provide a filter having means for separating and removing leaves and other vegetable matter and other gross impurities from the water before the latter is permitted to pass into the filtering compartment proper where such impurities would be liable to accumulate and decay, thus impregnating water that may be subsequently permitted to pass through the filtering compartment.

Further objects of the invention are to simplify and improve the construction and operation of this class of devices.

With these and other ends in view, which will appear as the nature of the invention is better understood the same consists in the improved construction and novel arrangement and combination of parts which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

Figure 1:
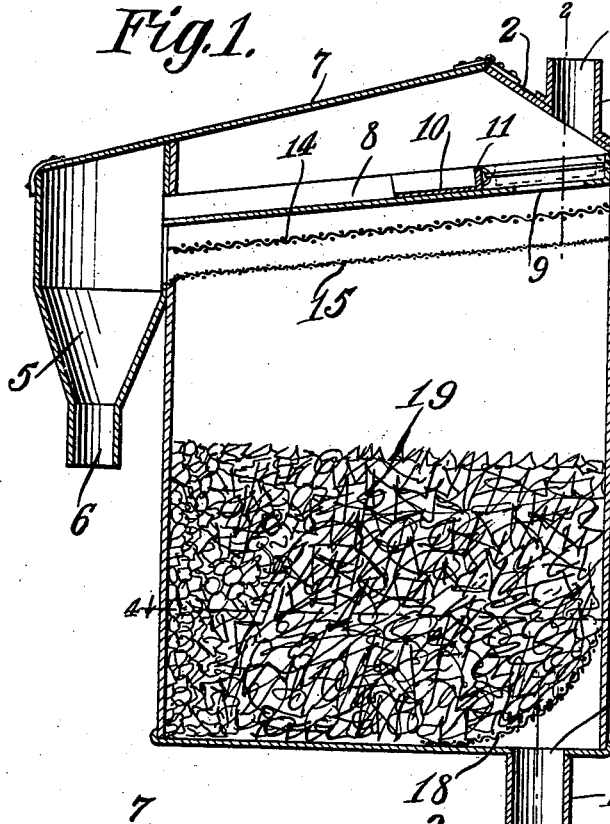
Figure 2:
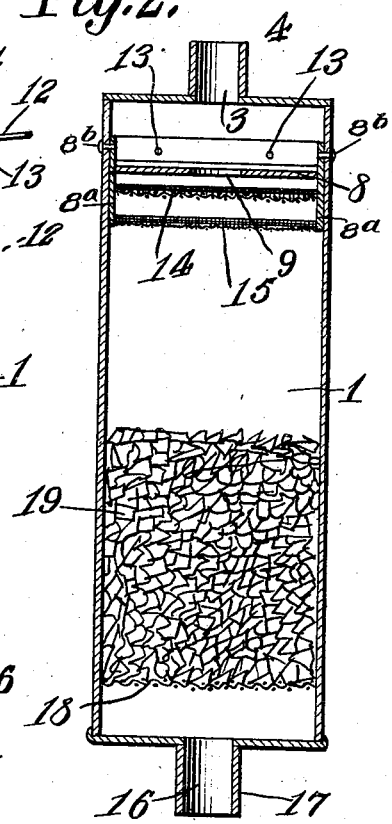
Figure 3:
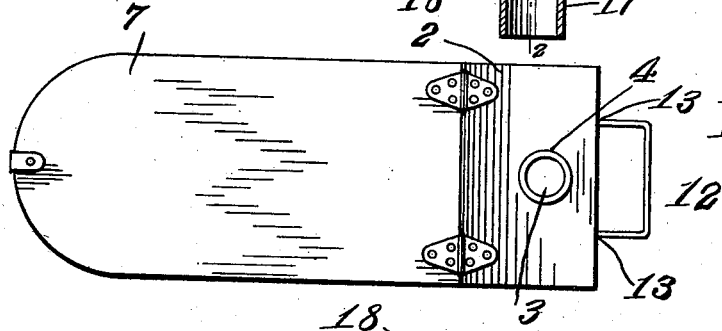
Figure 4:
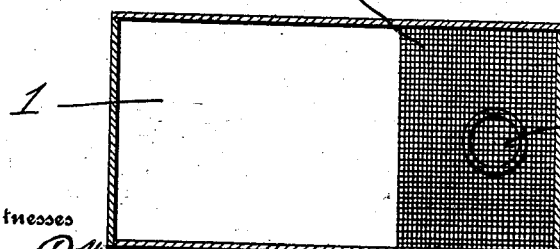

In the accompanying drawing:—Figure 1 is a vertical longitudinal sectional view of a filter constructed in accordance with the invention. Fig. 2 is a vertical transverse sectional view taken on the plane indicated by the line 2—2 in Fig. 1. Fig. 3 is a top plan view. Fig. 4 is a horizontal sectional view taken on the plane indicated by the line 4—4 in Fig. 1.

Corresponding parts in the several figures are indicated by like characters of reference.

The improved filter in its preferred form comprises an approximately rectangular casing 1 provided at its upper end with an inclined top flange 2 having an inlet aperture 3 surrounded by a flange 4 which may be readily connected with a pipe or duct through which the water that is to be filtered and purified may be conveyed to the filter. Upon the front wall of the filter casing is secured a funnel-shaped compartment 5 having an exit aperture 6. A lid or cover 7 hingedly connected with the top flange 2 extends over the upper end of the body of the filter casing and also over the compartment 5 for which a closure is thus provided.

In the upper end of the filter casing there is supported a trough or chute 8, the same being of a width equal to that of the filter casing in which the said trough forms a partition or diaphragm; this trough is disposed in an inclined position, its upper end being arranged beneath the inlet 3 and its lower end being arranged to discharge into the compartment 5; the trough 8 has an aperture 9 formed directly beneath the inlet 3, and this aperture may be covered or obstructed by a slide or valve 10 having at its rear edge a flange 11 with which is hingedly connected a bail or handle 12 which latter extends through apertures 13 in the rear wall of the filter casing so that, when the valve is moved to an obstructing position above the aperture 9, the bail or handle may be dropped to a non-obstructing position adjacent to the rear wall of the filter casing as will be seen in dotted lines in Fig. 1 of the drawings. The sides 8ª of the trough extend below the bottom thereof, and the trough is secured in applied position by means of pins 8ᵇ. Screens 14 and 15 are secured to the sides 8ª of the trough below the bottom thereof. The upper screen 14 is of relatively coarse and the lower screen is of relatively fine mesh, said screens or sieves being inclined, as shown, and connected at their lower ends with the compartment 5 into which material intercepted by said sieves will eventually be discharged. The trough 8 and the screens 14 and 15 may be readily and quickly removed to permit the removal of filtering agent without disconnecting the casing 1. The withdrawal of the pins 8ᵇ will permit the trough and the screens to be removed.

The bottom of the filter casing has an outlet 16 surrounded by a flange 17 with which a pipe or duct may readily be connected for the purpose of conveying the filtered water to a cistern or reservoir; and the outlet 16 is separated by a screen 18 from the body of the filter casing in which a packing 19 of charcoal or other suitable filtering material is placed in the usual manner.

The operation and advantages of the improved filter will be readily understood from the foregoing description when taken in connection with the drawings. The impure water entering through the inlet 3 may, by obstructing the aperture 9 by means of the valve 10, be directed into the compartment 5 and permitted to run to waste; this is usually continued until the roof or other surface from which the water is taken has been washed comparatively clean. The valve 10 is now moved to the non-obstructing position shown in Fig. 1 of the drawings, and water coming through the inlet 3 will now pass through the aperture 9 to the screens or sieves 14 and 15 which will operate as strainers whereby the water will be freed from coarse and gross impurities still contained therein before it is permitted to pass through the sieves into the filtering compartment and thence through the exit 16 to the reservoir provided for its reception. The impurities intercepted by the screens or sieves will pass over the latter and into the compartment 5 and to the waste pipe connected with said compartment.

The improved filter, as will be seen from the foregoing description, is simple in construction, and it will be found thoroughly efficient for the purposes for which it is provided. By the construction shown and described, gross impurities of all kinds will be withheld from the filtering compartment and the latter will thus be for a long period maintained in sweet and pure condition for effective operation.

Having thus described the invention, what is claimed as new, is:—

1. A filter of the character described, comprising a casing provided with a lower filtering compartment having an outlet, an upper receiving compartment having an inlet, an external waste compartment in communication with said casing, an inclined trough separating the filtering and receiving compartments and having an opening in its upper end below the inlet and communicating at its lower end with the waste compartment, a closure for governing said inlet, and screens supported by the trough and inclined in parallel relation thereto and having their lower ends opening into the waste compartment, said screens being supported by the trough and detachably mounted therewith for removal from the casing.

2. A filter of the character described comprising a casing having a bottom filtering compartment provided with an outlet, a receiving compartment having an inlet, a waste compartment disposed upon the outer side of the casing and in communication through an opening therewith, a cover for closing both the receiving compartment and the waste compartment, an inclined trough forming a partition separating the filtering and receiving compartments and provided at its upper end with an opening below the inlet of the latter, the lower end of said trough being in communication through an opening in the casing with the waste compartment, means detachably securing the trough in position, whereby it may be detached and removed through the top of the casing closed by the cover, flanges depending from the trough, and inclined screens supported by said flanges and communicating at their lower ends through the aforesaid opening with the waste compartment, said screens being removable with the trough.

3. A filter of the character described, comprising a casing having a bottom filtering compartment provided with an outlet, an upper receiving compartment provided with an inlet, and a waste compartment disposed externally upon one side of the casing and in communication with an opening therein, a cover for closing both the receiving and waste compartments, an inclined trough separating the filtering and receiving compartments and having an opening disposed in its upper portion below the inlet of the receiving compartment, said trough communicating at its lower end with the waste compartment and being provided with depending flanges, inclined screens supported by said depending flanges in parallel relation to the trough and communicating at their lower ends with the waste compartment, a closure for the opening in the trough slidably mounted upon the upper surface of the trough, and an operating device for said closure pivotally connected therewith and slidably mounted in the wall of the casing, the construction being such that when the closure is in obstructing position the operating device may be swung downward on its pivot parallel with the wall of the casing.

In testimony whereof we affix our signatures in presence of two witnesses.

GILBERT H. EASLEY.
FLETCHER O. BUCKLES.

Witnesses:
J. R. UNEKOLLS,
S. G. MORTON.